United States Patent
Hosein et al.

(10) Patent No.: US 7,680,125 B2
(45) Date of Patent: Mar. 16, 2010

(54) SCHEDULING PACKET DATA TRANSMISSIONS IN A PACKET DATA NETWORK BASED ON EARLY DECODED CHANNEL FEEDBACK REPORTS

(75) Inventors: Patrick A. Hosein, San Diego, CA (US); Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1051 days.

(21) Appl. No.: 11/253,319

(22) Filed: Oct. 19, 2005

(65) Prior Publication Data

US 2007/0086468 A1    Apr. 19, 2007

(51) Int. Cl.
*H04L 12/28*     (2006.01)
*H04L 12/56*     (2006.01)
*H04W 4/00*      (2009.01)
*H04W 72/00*     (2009.01)

(52) U.S. Cl. .................. 370/395.4; 370/329; 455/452.2
(58) Field of Classification Search ......... 370/328–335, 370/395.4, 252, 441, 236, 278, 208, 410, 370/329, 465; 455/63.1, 69, 522, 114.2, 455/466, 450, 452.2
See application file for complete search history.

(56) References Cited

U.S. PATENT DOCUMENTS

| | | | |
|---|---|---|---|
| 7,353,040 B2* | 4/2008 | Baker et al. | 455/522 |
| 2003/0087605 A1* | 5/2003 | Das et al. | 455/67.1 |
| 2003/0198312 A1* | 10/2003 | Budka et al. | 375/377 |
| 2004/0110473 A1* | 6/2004 | Rudolf et al. | 455/69 |
| 2004/0147276 A1* | 7/2004 | Gholmieh et al. | 455/522 |
| 2004/0208183 A1* | 10/2004 | Balachandran et al. | 370/395.21 |
| 2005/0047387 A1* | 3/2005 | Frederiksen et al. | 370/349 |
| 2005/0143084 A1* | 6/2005 | Cheng et al. | 455/452.2 |
| 2006/0023650 A1* | 2/2006 | Dominique et al. | 370/310 |
| 2006/0072508 A1* | 4/2006 | Zou et al. | 370/332 |
| 2006/0072510 A1* | 4/2006 | Aizawa | 370/333 |
| 2006/0135173 A1* | 6/2006 | Vannithamby | 455/453 |
| 2006/0285558 A1* | 12/2006 | Dottling et al. | 370/506 |
| 2007/0054689 A1* | 3/2007 | Baker et al. | 455/522 |
| 2008/0069031 A1* | 3/2008 | Zhang et al. | 370/328 |

OTHER PUBLICATIONS

"CDMA/HDR: A Bandwidth-Efficient High-Speed Wireless Data Service for Nomadic Users." Bender, Paul et al. IEEE Communications Magazine, Jul. 2000, pp. 70-77.
"Optimal Packet Transmission Power Strategy for H-ARQ Over Fading Channels." Hosein, Patrick et al. Porceedings of Global Mobile Contress, Chongquin, China, Oct. 2005.

* cited by examiner

*Primary Examiner*—Ayaz R Sheikh
*Assistant Examiner*—Hoang-Choung Q Vu
(74) *Attorney, Agent, or Firm*—Coats & Bennett, P.L.L.C.

(57) ABSTRACT

A method of scheduling wireless packet data traffic on a downlink packet data channel takes advantage of early decoding opportunities to decode the channel feedback reports before receipt of the mandated Lth repetition. The early-decoded channel feedback reports are promptly used in making scheduling decisions. Mobile stations are required to repeat transmissions of channel quality reports at least L times. The base station receives channel quality information report $CF_N$ from a first mobile station one or more times, but less than L times; and, prior to reception of the Lth repetition of $CF_N$, successfully decodes $CF_N$ to form a first decoded report. Packet data transmissions on the downlink packet data traffic channel are scheduled based on $CF_N$. A corresponding apparatus is also described.

13 Claims, 5 Drawing Sheets

SCHEDULING PACKET DATA TRANSMISSIONS IN A PACKET DATA NETWORK BASED ON EARLY DECODED CHANNEL FEEDBACK REPORTS

BACKGROUND OF THE INVENTION

The present invention relates to packet data mobile communication systems; and, more particularly, to methods of scheduling transmission of packets on a time shared downlink packet data channel.

The demand for wireless data services, such as mobile Internet, video streaming, and voice over IP (VoIP), have led to the development of high speed packet data channels to provide high data rates needed for such services. High speed packet data channels are employed on the forward link in a variety of mobile communication systems, including IS-2000 (also known as 1xEV-DV), 1xEV-DO (also known as IS-856, Rev. A, or simply IS-856A), and Wideband Code Division Multiple Access (WCDMA) systems. The high speed packet data channel is a time shared channel, with downlink transmissions, e.g., from a base station to mobile stations, time-multiplexed and typically transmitted at full power.

Deciding which mobile station to serve at a given time is the function of a "scheduler." A number of different scheduling strategies can be used, each with a different implication for system throughput and fairness. Typical scheduling strategies include round-robin scheduling, maximum throughput scheduling, and proportional fairness scheduling. In round-robin scheduling, the scheduler assigns the same number of time slots to all users, or assigns time slots on a first-come, first-serve basis, without taking into account channel conditions. Round-robin scheduling achieves a measure of fairness, but at the expense of lower throughput. Maximum throughput scheduling and proportional fairness scheduling, in contrast, attempt to increase system throughput as compared to round-robin scheduling by taking into account current channel conditions. A maximum throughput scheduler favors mobile stations with the best channel conditions and hence the highest supportable data rate to maximize system throughput. Proportional fairness scheduling tempers maximum throughput scheduling with a fairness criteria, so that mobile stations with bad channel conditions for an extended period can be served.

The scheduler makes scheduling decisions and selects the appropriate modulation and coding schemes based on channel feedback from the mobile stations. In 1xEV-DV and WCDMA systems, the mobile stations measure the quality of the forward packet data channel and transmit a channel quality indicator (CQI) to the base station. The base station maps the reported CQI value to one of a set of predefined modulation and coding schemes. The selected modulation and coding scheme determines the data rate for the downlink packet transmission used for scheduling (the "scheduling rate"). In 1xEV-DO systems, the mobile stations measure the quality of the forward packet data channel and transmit a data rate control (DRC) value to the base station. The base station maps the DRC value to the "scheduling" rate for the downlink transmission. The scheduling rate is then used by the scheduler to make scheduling decisions.

Frequently, mobile stations are required to repeat each channel feedback report for a number of repetitions, in order to reduce the mobile station power required to make these reports. Thus, a given mobile station may be required to transmit each channel feedback report L times. Assuming each channel feedback report is transmitted in a separate slot, then the channel feedback reports have a minimum cycle time of L slots. However, the channel conditions may change more rapidly than every L slots. As such, the scheduling algorithms necessarily make scheduling decisions based on the most recent, but still possibly slightly out of date, channel feedback information in these situations.

It has been recognized that better link utilization of the downlink packet data channel may be achieved if more timely channel feedback information is used. Thus, one approach is to set $L=1$; however, this approach consumes greater power at the mobile station and loses the advantage of time diversity gains on the reverse link. Thus, L is typically set to a higher value, with the particular value established based on a tradeoff between the savings from higher L values and staleness of the channel feedback information. Further, the value of L is typically set on a sector wide basis, and based on the conditions of the user with the poorest reverse link conditions. Thus, it is possible that channel feedback reports from users with better reverse link conditions may be safely received after a smaller number of repetitions (i.e., <L). At present, the scheduler does not take advantage of this situation, but instead waits until all L repetitions are received before scheduling based on the new channel feedback report.

SUMMARY OF THE INVENTION

A method of scheduling wireless packet data traffic on a downlink packet data channel takes advantage of early decoding opportunities to decode the channel feedback reports before receipt of the Lth repetition, and promptly uses the early-decoded channel feedback reports to increase utilization of the downlink packet data channel.

In one embodiment, the present invention provides a method of scheduling wireless packet data traffic on a downlink packet data traffic channel shared by a plurality of mobile stations, the method comprising: requiring mobile stations reporting channel quality to the base station for a given time interval to repeat transmission of the corresponding channel quality information report at least L times; receiving, at the base station, a first channel quality information report from a first mobile station one or more times, but less than L times; and, prior to reception of the Lth repetition of the first channel quality information report, the base station successfully decoding the first channel quality information report to form a first decoded report; and scheduling packet data transmissions on the downlink packet data traffic channel based on the first decoded report. Successive channel quality intervals may be defined between the reception of Lth repetitions of successive channel quality information reports from the first mobile station. The method may further comprise receiving channel quality information reports from the first mobile station in a plurality of channel quality intervals, including a first channel quality interval ending with the Lth repetition of the first channel quality information report. The scheduling may comprise scheduling packet data transmissions on the downlink packet data traffic channel during a portion of the first channel quality interval. A first downlink transmission rate for transmissions to the first mobile station during the first channel quality interval may be $D_1$; a second downlink rate for scheduling transmissions to the first mobile station during a second channel quality interval may be $D_2$, with the second quality interval immediately succeeding the first channel quality interval; $D_2$ being based on the first channel quality information report and different from $D_1$; and the method may further comprise transmitting, at transmission rate $D_1$, one or more packets to the first mobile station during the first channel quality interval; the one or more packets scheduled based on the first decoded report. The method may further comprise transmitting one or more additional packets to the first mobile station during the second channel quality interval at downlink rate $D_2$. The method may comprise scheduling packet data transmissions on the downlink packet data traffic channel to the first mobile station; the transmissions occurring after reception of the temporally first repetition of the first channel quality information report and prior to reception of the Lth repetition of the first channel quality information report. The channel quality information reports may comprise a DRC value. The base station may advantageously be compliant with IS-856A. A corresponding apparatus is also described.

In another embodiment, the present invention provides a method of scheduling wireless packet data traffic on a downlink packet data traffic channel shared by a plurality of mobile stations, the method comprising: establishing a channel quality information repetition rate L requiring a first mobile station reporting channel quality to the base station to repeat transmission of each channel quality information report to the base station at least L times; receiving a first channel quality information report from the first mobile station one or more times, but less than L times; and, prior to reception of the Lth repetition of the first channel quality information report, the base station successfully decoding the first channel quality information report; and scheduling packet data transmissions on the downlink packet data traffic channel based on the decoding. The base station may advantageously be compliant with IS-856A. A corresponding apparatus is also described.

DETAILED DESCRIPTION OF THE INVENTION

The present invention relates to the scheduling of packet data transmitted on a downlink packet data traffic channel in a wireless communication system 10 having a plurality of mobile stations 100 operating therein. As such, a brief overview of an exemplary wireless communication system 10 may aid in understanding the present invention.

Figure 1:
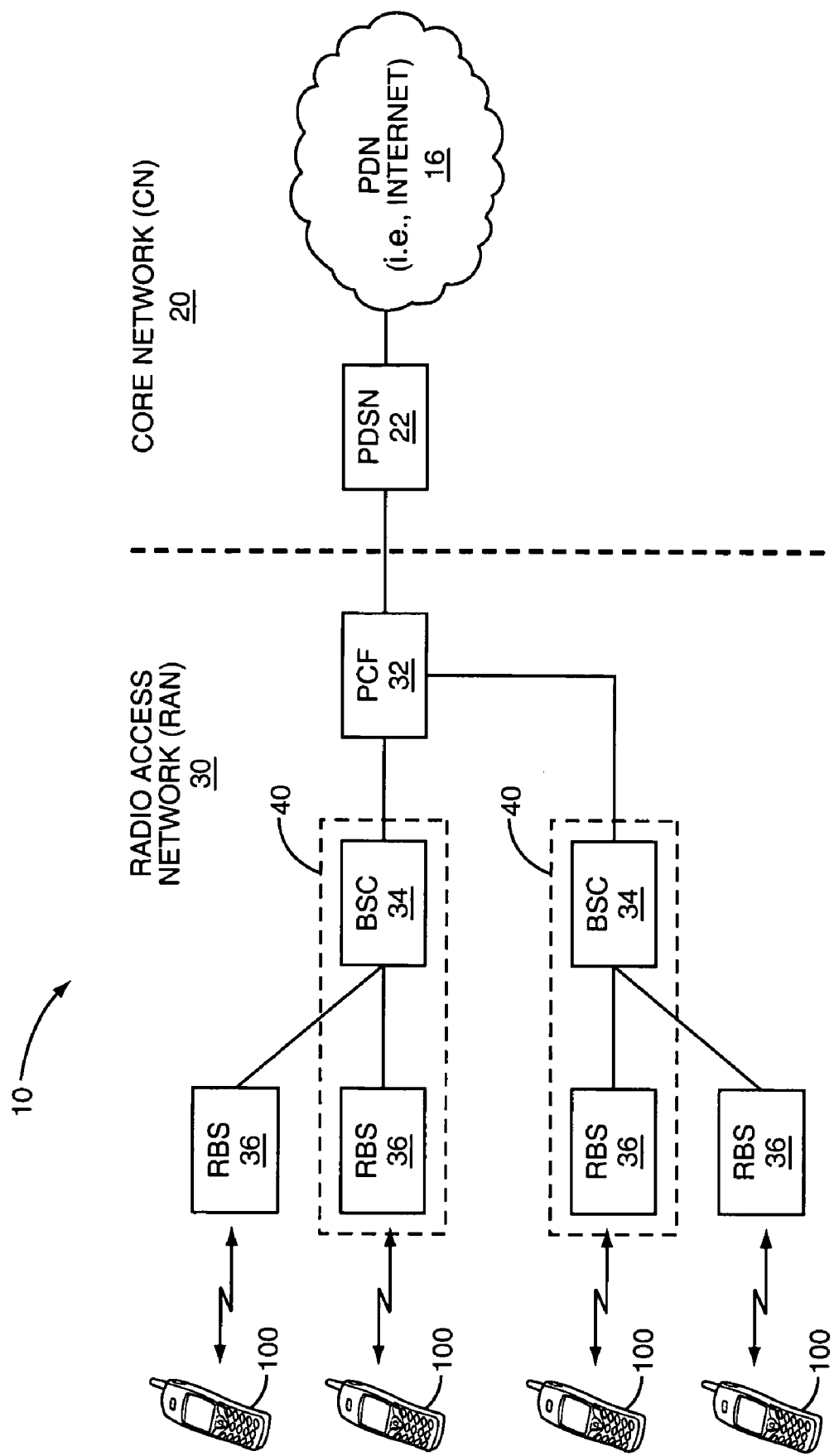
FIG. 1 shows an exemplary wireless communication network.

FIG. 1 illustrates the logical entities of an exemplary wireless communication network 10 that provides packet data services to mobile stations 100. For purposes of illustration, the wireless communication network 10 is configured according to the 1xEV-DO standard, although other standards, such as the IS-2000 standard, Wideband CDMA (W-CDMA) standard, etc., may alternatively or additionally be employed. The wireless communication network 10 is a packet-switched network that employs a high-speed forward packet data channel (F-PDCH) to transmit data to the mobile stations 100. Wireless communication network 10 includes a packet-switched core network 20 and a radio access network (RAN) 30. The core network 20 includes a Packet Data Serving Node (PDSN) 22 that connects to an external packet data network (PDN) 16, such as the Internet, and supports PPP connections to and from the mobile stations 100. Core network 20 adds and removes IP streams to and from the RAN 30 and routes packets between the external packet data network 16 and the RAN 30.

RAN 30 connects to the core network 20 and gives mobile stations 100 access to the core network 20. RAN 30 includes a Packet Control Function (PCF) 32, one or more base station controllers (BSCs) 34 and one or more radio base stations (RBSs) 36. The primary function of the PCF 32 is to establish, maintain, and terminate connections to the PDSN 22. The BSCs 34 manage radio resources within their respective coverage areas. The RBSs 36 include the radio equipment for communicating over the air interface with mobile stations 100. A BSC 34 can manage more than one RBSs 36. In CDMA2000 networks, a BSC 34 and an RBS 36 comprise a base station 40. The BSC 34 is the control part of the base station 40. The RBS 36 is the part of the base station 40 that includes the radio equipment and is normally associated with a cell site. In CDMA2000 networks, a single BSC 34 may function as the control part of multiple base stations 40. In other network architectures, the network components comprising the base station 40 may be different, but the overall functionality will be the same or similar.

Figure 2:
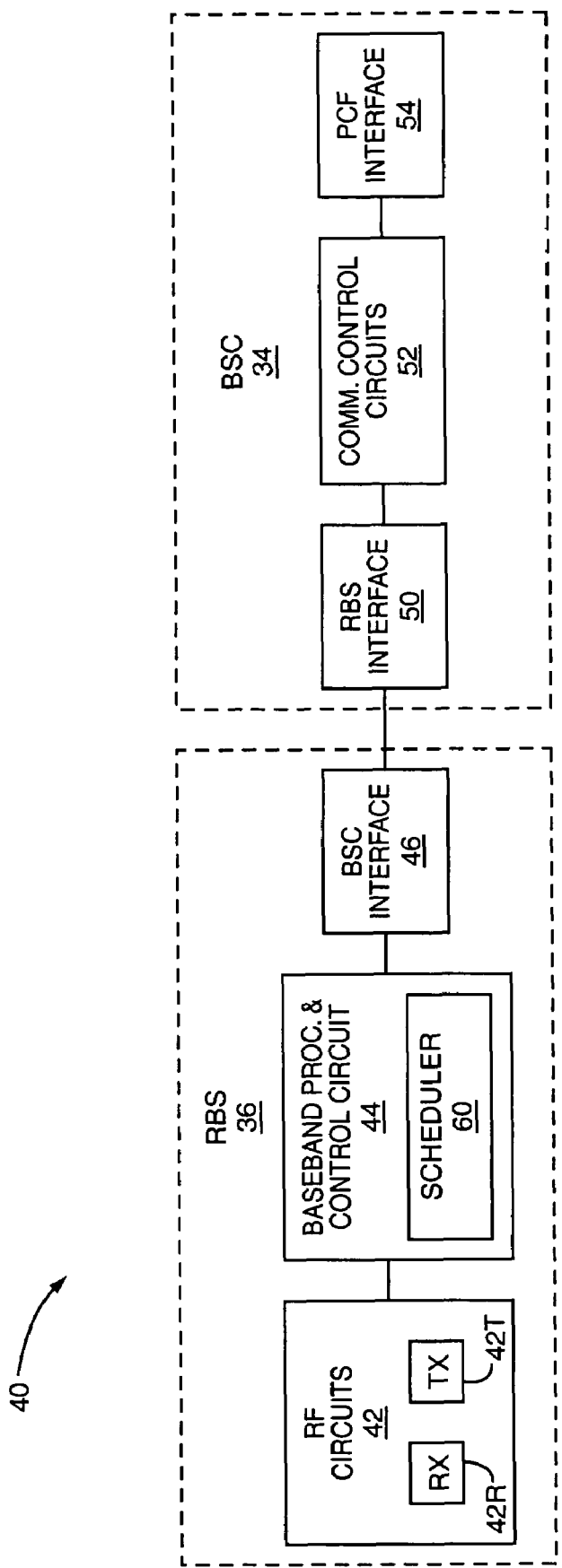
FIG. 2 shows an exemplary base station.

FIG. 2 illustrates exemplary details of a base station 40. The base station components in the exemplary embodiment are distributed between a RBS 36 and a BSC 34. The RBS 36 includes RF circuits 42, baseband processing and control circuits 44, and interface circuits 46 for communicating with the BSC 34. The RF circuits 42 include one or more transmitters 42T and receivers 42R, which transmit signals to, and receive signals from, the mobile stations 100. For example, the receiver 42T receives the channel quality feedback reports from the mobile stations 100 and passes the same on to the baseband processing and control circuits 44 for processing. The baseband processing and control circuits 44 perform baseband processing of transmitted and received signals. In the embodiment shown in FIG. 2, the baseband processing and control circuit 44 includes a scheduler 60 to schedule packet data transmissions on the Forward Packet Data Channel (F-PDCH). The scheduler 60 makes scheduling decisions and selects the appropriate modulation and coding schemes based on, inter alia, channel feedback from the mobile stations 100. The baseband processing and control circuit 44, including the scheduler 60, may be implemented as one or more processing circuits, comprising hardware, software, or any combination thereof, that are configured as appropriate to implement one or more of the processes described herein. For example, the baseband processing and control circuit 44 may be implemented as stored program instructions executed by one or more microprocessors or other logic circuits included in RBS 36.

The BSC 34 includes interface circuits 50 for communicating with the RBS 36, communication control circuits 52, and interface circuits 54 for communicating with PCF 32. The communication control circuits 52 manage the radio and communication resources used by the base station 40. The communication control circuits 52 are responsible for setting up, maintaining and tearing down communication channels between the RBS 36 and mobile station 100. The communication control circuits 52 may also allocate Walsh codes and perform power control functions. The communication control circuits 52 may be implemented in software, hardware, or some combination of both. For example, the communication control circuits 52 may be implemented as stored program instructions executed by one or more microprocessors or other logic circuits included in BSC 34.

Figure 3:
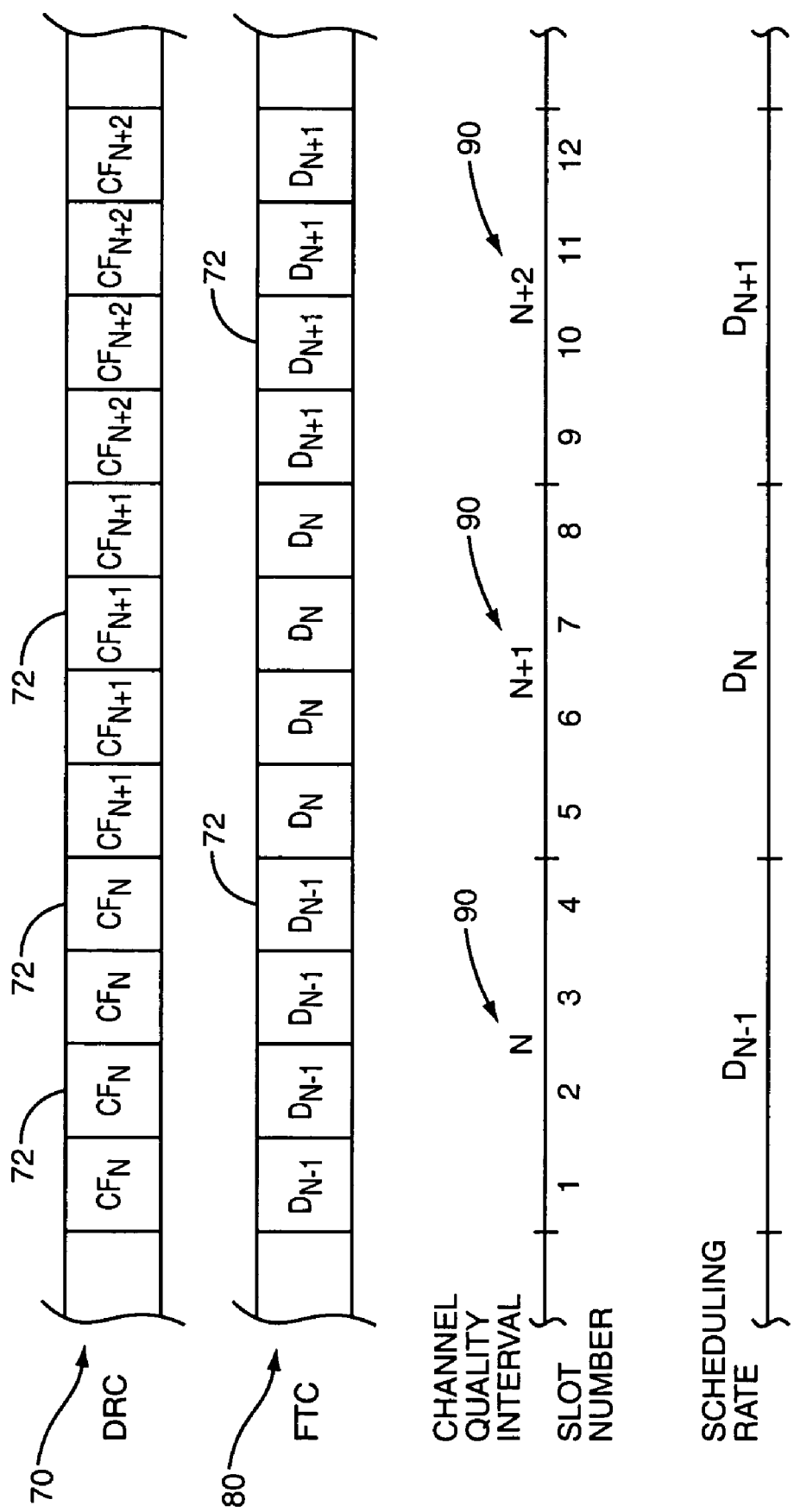
FIG. 3 shows the timing of channel feedback reports and scheduling use thereof according to the prior art.

In general, the RAN 30 requires that mobile stations 100 periodically provide channel quality feedback about the downlink packet data channel 80 in the form of channel quality feedback reports (CF). For example, in a 1xEV-DO system, the channel quality feedback report CF takes the form of a DRC report (or value) established at the mobile stations 100 in a conventional manner. The DRC reports are transmitted from the mobile stations 100 to the base station 40 on a periodic basis, typically on the reverse channel known as the DRC channel 70 (see FIG. 3). Further, the RAN 30 typically requires that mobile stations 100 repeat the transmission of each DRC report at least a minimum number of times in order to take advantage of time diversity gains. For the illustrative example, the RAN 30 sends the mobile stations 100 a repetition value called DRClength that requires the mobile stations 100 to repeat each DRC report L times (i.e., over L consecutive slots). Each mobile station 100 may have a different DRClength setting, but the DRClength is typically consistent across a base station's sector for all mobile stations 100. The period between the Lth repetition of successive DRC reports from a given mobile station is referred to herein as the channel quality interval 90 for that mobile station. See FIG. 3.

The base station 40 receives the channel feedback reports CF from the mobile stations 100 and bases scheduling decisions thereon. In conventional systems, the base station 40 waits until the receipt of the Lth repetition of the channel feedback report $CF_N$ to decode the channel feedback report, and then uses the resulting information, e.g., the scheduling rate $D_N$, for scheduling decisions for the duration of the next channel quality interval 90 (interval N+1). See FIG. 3. Thus, the channel feedback report $CF_N$ received in channel quality interval N is valid for both scheduling and transmission rate purposes only during following channel quality interval N+1. Using the present invention, this situation changes.

Figure 4:
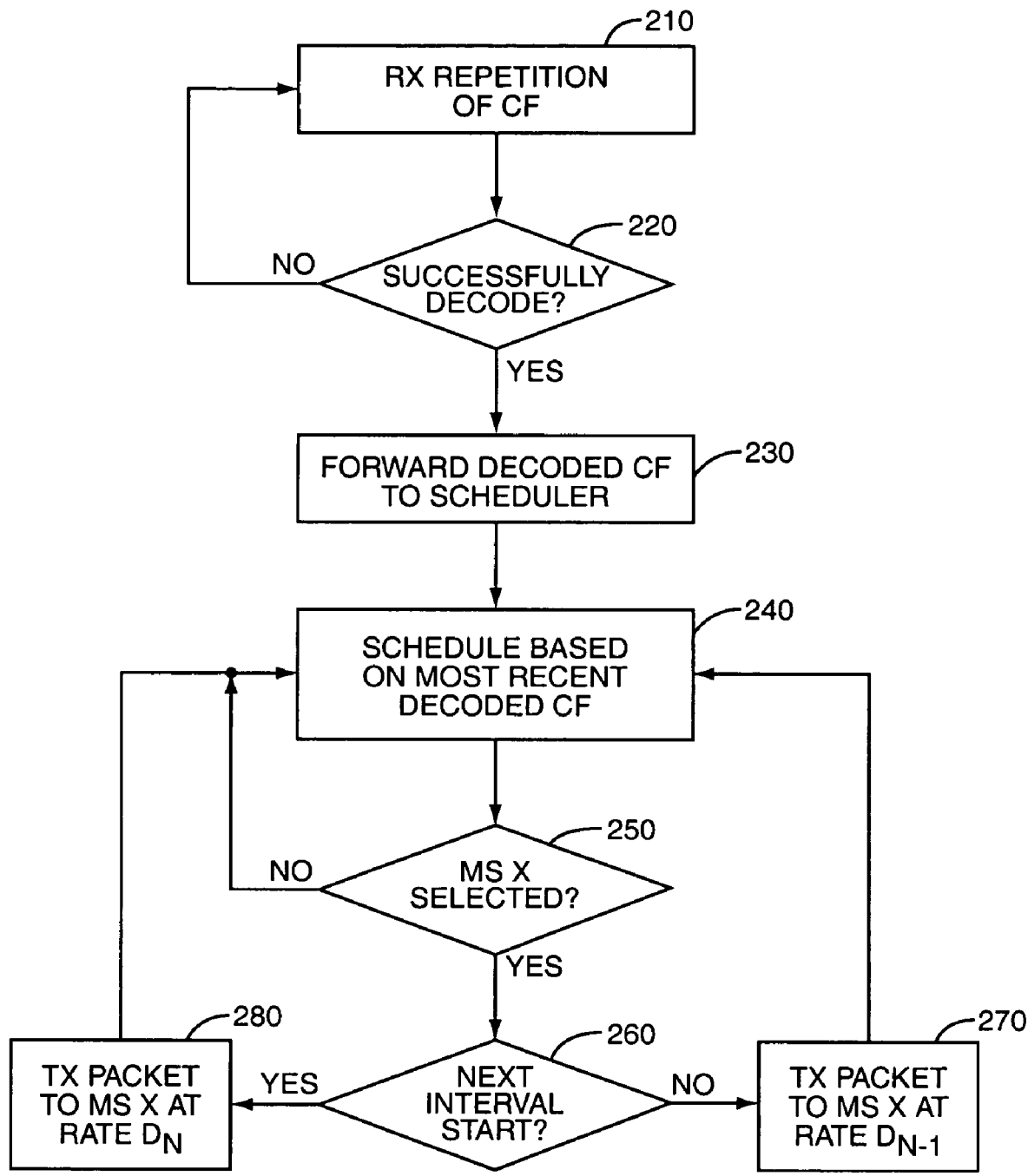
FIG. 4 shows a flowchart for a base station operation according to one embodiment of the present invention.

According the present invention, the base station 40 may take advantage of situations when the channel feedback reports CF may be successfully decoded before receipt of the Lth repetition to potentially increase utilization of the downlink packet data channel 80. With reference to FIG. 4, the channel feedback report cycle may be presently in cycle interval N. That is, the relevant mobile station (mobile station X (MS X)) is transmitting channel feedback report $CF_N$ to the base station 40. The base station 40, at the start of the process, is using channel feedback report from the previous channel quality interval (report $CF_{N-1}$) to establish the corresponding scheduling transmission rate $D_1$ for mobile station X. The process of FIG. 4 is best understood in the context mobile station X, transmitting a repetition of the channel feedback report once each slot 72. The base station 40 receives the channel feedback report repetition at step 210. It should be noted that, while not shown, step 210 is repeated for each slot 72, with the corresponding channel feedback report CF changing based on the current channel quality interval 90. After receipt of a repetition of channel feedback report (step 210), for purposes of illustration report $CF_N$ in slot number 1, the base station 40 attempts to decode channel feedback report $CF_N$ and checks to see if the decoding is successful (step 220). For example, a successful decode may be indicated by the associated decoding metrics being above a predetermined threshold that indicates a successful decode operation. If the decoding is not successful, the process loops back to await the reception of the next repetition of the channel feedback report (step 210), with the various repetitions of a given channel feedback report soft combined for the next attempt at decoding to take advantage of time diversity gains. For example, the first repetition of $CF_N$ from slot number 1 would be soft combined with the second repetition of $CF_N$ from slot number 2 for the second attempted decode of $CF_N$. However, if the decoding successfully produces a decoded channel feedback report, the decoded channel feedback report is passed to the scheduler 60 (step 230). The scheduler 60 then uses this decoded report to establish a new scheduling transmission rate $D_N$ for mobile station X, and promptly uses that scheduling transmission rate in the next scheduling analysis (step 240). If the scheduling analysis indicates that a packet should be transmitted to mobile station X (step 250), the base station 40 determines if the time for reception of the Lth repetition of channel feedback report $CF_N$ will have passed by the scheduled transmission time (step 260). If so, the base station 40 transmits the packet at rate $D_N$ (step 280), because this is the rate that mobile station X is expecting for downlink transmissions on the forward traffic channel 80 during channel quality interval N+1. If, however, the time for the reception of the Lth repetition of channel feedback report $C_N$ will not have passed by the scheduled transmission time for the packet, the base station transmits the packet at transmission rate $D_{N-1}$ (step 270), which is the transmission rate expected by mobile station X for downlink transmissions on the forward traffic channel 80 during channel quality interval N.

Figure 5:
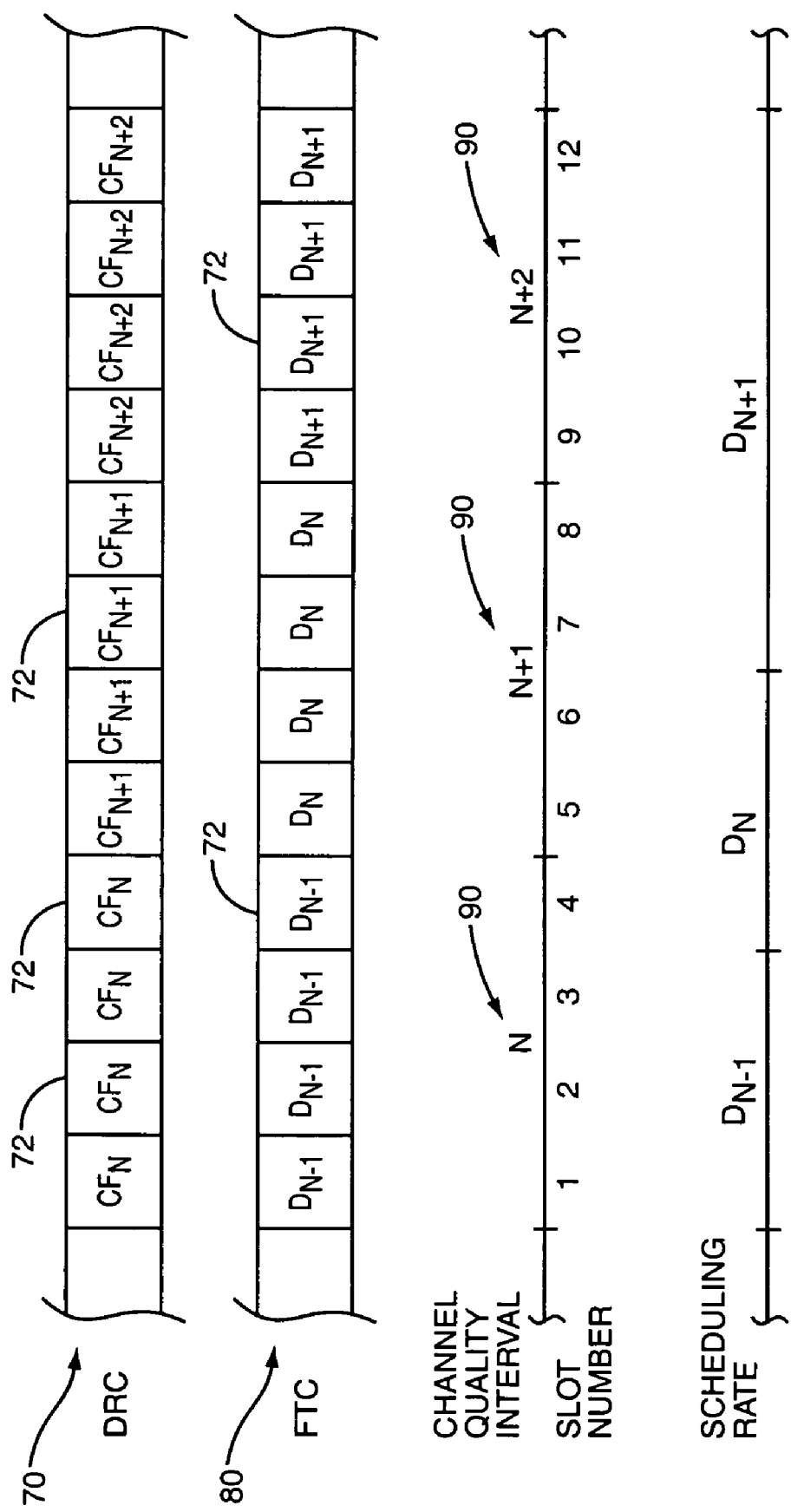
FIG. 5 shows an illustrative example of the timing of channel feedback reports and scheduling use thereof according to one embodiment of the present invention.

Turning to FIG. 5, the interaction of the various parameters may be seen. For simplicity, FIG. 5 assumes a DRClength of four slots and that the scheduler 60 makes a new scheduling decision each slot. The mobile station 100 transmits the channel feedback report four times in each channel quality interval (cycle) 90, once in each slot 72. Thus, the mobile station 100 transmits the channel feedback report $CF_N$ during channel quality interval N, channel feedback report $CF_{N+1}$ during channel quality interval N+1, and so forth. The base station 40 transmits packet data to the mobile station on the forward packet data channel (FTC) 80 using transmission rates denoted $D_{N-1}, D_N, D_{N+1}$, in channel quality intervals N, N+1, N+2, respectively. Assume that the base station 40 is able to successfully decode channel feedback report $CF_N$ after the third repetition. At this point, the scheduler 60 immediately begins using rate $D_N$ as the scheduling rate for the mobile station 100. Thus, the scheduling decisions made at slot 4 are made based on $D_N$, not $D_{N-1}$. Assuming that the mobile station 100 is selected, the downlink transmission rate would be $D_{N-1}$ for slot 4, but $D_N$ starting in slot 5 (the beginning of channel quality interval N+1). Now, assume that the reverse link channel quality improves, and the base station 40 is able to successfully decode channel feedback report after only two repetitions of report $CF_{N+1}$ (i.e., after slot 6). The scheduler 60 then immediately begins using rate $D_{N+1}$ as the scheduling rate for the mobile station 100. Thus, the scheduling decisions made at slots 7 and 8 are made based on $D_{N+1}$, not $D_N$. Assuming that the mobile station 100 is selected, the downlink transmission rate would be $D_N$ for slots 7 and 8, but $D_{N+1}$ starting in slot 9 (the beginning of channel quality interval N+2). However, now assume that the channel quality on the reverse link quickly degrades. As such, the base station 40 is not able to successfully decode channel feedback report $CF_{N+2}$ until after the fourth repetition (i.e., after slot 12). As such, the scheduler 60 continues to use scheduling rate $D_{N+1}$ to make scheduling decisions for slots 7-12, and does not start using scheduling rate $D_{N+2}$ (derived from $CF_{N+2}$) until slot 13 (the start of channel quality interval N+3). Thus, the scheduler 60 begins using scheduling rate $D_N$ one slot early, scheduling rate $D_{N+1}$ two slots early, but scheduling rate $D_{N+2}$ at the normal time.

From the above, it may be seen that in some situations the base station 40 may take advantage of early decoding opportunities to decode the channel feedback reports CF before receipt of the Lth repetition, and promptly use the early-decoded channel feedback reports to increase utilization of the downlink packet data channel 80. It should be noted that even with this approach, the base station 40, in some situations, must wait for the Lth repetition of a given channel feedback report to be received before that channel feedback report can be successfully decoded and used for scheduling purposes. Thus, while the potential for improvement in performance may not be present in every channel quality interval 90, the potential should be present in at least some channel quality intervals 90. Further, while the potential for improved performance may be present, it may or may not be realized in a given channel quality interval 90, depending a number of factors.

Two examples in a maximum throughput scheduling scenario help show the potential for, and realization of, increased utilization performance. First, consider the case in which the early-decoded channel feedback report $CF_N$ from mobile station X maps to a higher rate $D_N$ than the rate $D_{N-1}$ presently being used by the scheduler 60. Suppose that the scheduler 60 instead uses $D_N$ in making its decision as soon as $D_N$ is available. If this does not change the outcome of the scheduling decision, there is no change in performance. However, if the decision outcome is different, this must be because the mobile station X is chosen to be served if $D_N$ is used, but is not chosen if $D_{N-1}$ is used. If the scheduler 60 could serve mobile station X at rate $D_N$, then there is a utilization gain because this outcome is preferred over the choice of any other mobile station, including the choice of the mobile station that would have been chosen if $D_{N-1}$ was used in the scheduler 60. If mobile station X is served at rate $D_{N-1}$, then the packet will almost surely early terminate because the radio conditions are better than expected (because $D_N > D_{N-1}$). This results in an effective downlink transmission rate close to $D_N$. Hence, some utilization gains are realized. Therefore, the expected change in performance is non-negative. In this case, the scheduler 60 uses the sooner-available channel feedback report $CF_N$ to make a more aggressive decision.

Next, consider the other case in which $D_N < D_{N-1}$. Again, if the scheduler's decision is the same regardless of whether the scheduler 60 uses either value, then the performance does not change. However, it the scheduler 60 does not pick mobile station X based on $D_N$, but would have picked mobile station X if rate $D_{N-1}$ were used, there is increased performance. If the packet were transmitted to mobile station X at $D_{N-1}$, then the packet transmission is very likely to fail, resulting in wasted slot(s) 72 due to the radio conditions having deteriorated (i.e., $D_N < D_{N-1}$). On the other hand, if the scheduler 60 had used $D_N$ and instead not scheduled mobile station X, then some other mobile station 100 would have been served. Although the priority function gain in choosing this other mobile station 100 is likely not large, the "other" mobile station is more likely to receive its packet correctly and hence the slot(s) 72 are not wasted. Therefore, again the expected value of the performance gain is non-negative. In this case, the scheduler 60 uses the sooner-available channel feedback report $CF_N$ to make a more conservative decision, but with a more positive result.

It should be noted that the temporally first transmission/reception of the channel feedback report CF is considered to be the first repetition of the report. Thus, a channel feedback report CF that is transmitted/received exactly four times is considered, in the context of the present invention, to have four repetitions.

The present invention, in most if not all embodiments, may be implemented in existing systems through software changes at the base station 40, without requiring any corresponding changes to any mobile stations 100. Indeed, use of most embodiments of the present invention will typically be transparent to the mobile stations 100, as there are no required changes to their transmissions, or to the expected downlink packet data transmission rates to the mobile stations 100.

Thus, the improvements offered by the present invention may be realized by updating existing systems without placing significant extra burden on system users.

As used herein, the term "mobile station" 100 may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of scheduling wireless packet data traffic on a downlink packet data traffic channel shared by a plurality of mobile stations, comprising:

requiring mobile stations reporting channel quality to the base station for a given time interval to repeat transmission of the corresponding channel quality information report at least L times;

receiving, at the base station, a first channel quality information report from a first mobile station one or more times, but less than L times; and, prior to reception of the Lth repetition of said first channel quality information report, said base station successfully decoding said first channel quality information report to form a first decoded report; wherein successive channel quality intervals are defined between the reception of Lth repetitions of successive channel quality information reports from said first mobile station, and further comprising receiving channel quality information reports from said first mobile station in a plurality of channel quality intervals, including a first channel quality interval ending with said Lth repetition of said first channel quality information report; and scheduling packet data transmissions on said downlink packet data traffic channel based on said first decoded report:

wherein a first downlink transmission rate for transmissions to said first mobile station during said first channel quality interval is $D_1$;

wherein a second downlink rate for scheduling transmissions to said first mobile station during second channel quality interval is $D_2$, said second quality interval immediately succeeding said first channel quality interval; $D_2$ being based on said first channel quality information report and different from $D_1$; and further comprising transmitting, at transmission rate $D_1$, one or more packets to said first mobile station during said first channel quality interval, said one or more packets scheduled based on said first decoded report.

2. The method of claim 1 wherein said scheduling comprises scheduling packet data transmissions on said downlink packet data traffic channel during a portion of said first channel quality interval.

3. The method of claim 1 further comprising transmitting one or more additional packets to said first mobile station during said second channel quality interval at downlink rate $D_2$.

4. The method of claim 1 wherein said scheduling comprises scheduling packet data transmissions on said downlink packet data traffic channel to said first mobile station; said transmissions occurring after reception of the temporally first repetition of said first channel quality information report and prior to reception of the Lth repetition of said first channel quality information report.

5. The method of claim 1 wherein said first channel quality information report comprises a DRC value.

6. The method of claim 1 wherein said base station is compliant with IS-856A.

7. A method of scheduling wireless packet data traffic on a downlink packet data traffic channel shared by a plurality of mobile stations, comprising:
  establishing a channel quality information repetition rate L requiring a first mobile station reporting channel quality to the base station to repeat transmission of each channel quality information report to the base station at least L times;
  receiving a first channel quality information report from said first mobile station one or more times, but less than L times; and, prior to reception of the Lth repetition of said first channel quality information report, said base station successfully decoding said first channel quality information report; wherein successive channel quality intervals are defined between the reception of Lth repetitions of successive channel quality information reports from said first mobile station, and further comprising receiving channel quality information reports from said first mobile station in a plurality of channel quality intervals, including a first channel quality interval ending with said Lth repetition of said first channel quality information report; and
  scheduling packet data transmissions on said downlink packet data traffic channel based on said decoding:
    wherein a first downlink transmission rate for transmissions to said first mobile station during said first channel quality interval is $D_{12}$;
    wherein a second downlink rate for scheduling transmissions to said first mobile station during a second channel quality interval is $D_2$, said second quality interval immediately succeeding said first channel quality interval; $D_2$ being based on said first channel quality information report and different from $D_1$; and
    further comprising transmitting, at transmission rate $D_1$, one or more packets to said first mobile station during said first channel quality interval; said one or more packets scheduled based on said first decoded report.

8. The method of claim 7 further comprising transmitting one or more additional packets to said first mobile station during said second channel quality interval at downlink rate $D_2$.

9. The method of claim 8 wherein said base station is compliant with IS-856A.

10. A base station for a wireless communications system, said wireless communications system requiring mobile stations reporting channel quality to the base station for a given time interval to repeat transmission of the corresponding channel quality information report at least L times, the base station comprising:
  a transmitter operative to transmit downlink packet data to a plurality of mobile stations;
  a receiver operative to receive channel quality information reports from a first mobile station, including at least a first channel quality information report;
  one or more processing circuits operatively coupled to said transmitter and said receiver and configured to:
    successfully decode, after reception of said first channel quality information report one or more times, but prior to the Lth reception thereof, said first channel quality information report to form a first decoded report; wherein successive channel quality intervals are defined between the reception of Lth repetitions of successive channel quality information reports from said first mobile station; and wherein said receiver is operative to receive channel quality information reports from said first mobile station in a plurality of channel quality intervals, including a first channel quality interval ending with said Lth repetition of said first channel quality information report; and
    schedule packet data transmissions on a downlink packet data traffic channel based on said first decoded report:
      wherein a first downlink transmission rate for transmissions to said first mobile station during said first channel quality interval is $D_1$;
      wherein a second downlink rate for scheduling transmissions to said first mobile station during a second channel quality interval is $D_2$, said second quality interval immediately succeeding said first channel quality interval; $D_2$ being based on said first channel quality information report and different from $D_1$; and
      wherein said one or more processing circuits are configured to cause said transmitter to transmit, at transmission rate $D_1$, one or more packets to said first mobile station during said first channel quality interval; said one or more packets scheduled by said one or more processing circuits based on said first decoded report.

11. The base station of claim 10 wherein said one or more processing circuits are configured to schedule packet data transmissions on a downlink packet data traffic channel during a portion of said first channel quality interval.

12. The base station of claim 10 wherein said one or more processing circuits are further configured to:
  schedule one or more additional packets for transmission during said second channel quality interval; and
  cause said transmitter to transmit said one or more additional packets to said first mobile station during said second channel quality interval at downlink rate $D_2$.

13. The base station of claim 12 wherein said one or more processing circuits are further configured to schedule downlink data packet transmissions in a manner compliant with IS-856A.

* * * * *

UNITED STATES PATENT AND TRADEMARK OFFICE
CERTIFICATE OF CORRECTION

PATENT NO. : 7,680,125 B2
APPLICATION NO. : 11/253319
DATED : March 16, 2010
INVENTOR(S) : Hosein et al.

Page 1 of 1

It is certified that error appears in the above-identified patent and that said Letters Patent is hereby corrected as shown below:

On the Title Pg, Item (56), under "OTHER PUBLICATIONS", Line 5,
delete "Porceedings" and insert -- Proceedings --, therefor.

On the Title Pg, Item (56), under "Assistant Examiner", Line 1,
delete "Hoang-Choung Q Vu" and insert -- Hoang-Chuong Q Vu --, therefor.

In Column 1, Line 55, delete "IxEV-DO" and insert -- 1xEV-DO --, therefor.

In Column 8, Line 51, in Claim 1, after "during" insert -- a --.

In Column 9, Line 40, in Claim 7, delete "$D_{12}$;" and insert -- $D_1$; --, therefor.

Signed and Sealed this

Sixth Day of July, 2010

David J. Kappos
*Director of the United States Patent and Trademark Office*